United States Patent
Nagy

(10) Patent No.: US 7,091,291 B1
(45) Date of Patent: Aug. 15, 2006

(54) OLEFIN POLYMERIZATION PROCESS

(75) Inventor: Sandor Nagy, Naperville, IL (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/286,496

(22) Filed: Nov. 23, 2005

(51) Int. Cl.
*C08F 4/42* (2006.01)

(52) U.S. Cl. .................. 526/161; 526/348; 526/172; 526/901

(58) Field of Classification Search ............... 526/161, 526/348, 172, 901
See application file for complete search history.

(56) References Cited

U.S. PATENT DOCUMENTS

| | | | |
|---|---|---|---|
| 5,459,116 A | 10/1995 | Ro et al. | 502/115 |
| 5,637,660 A | 6/1997 | Nagy et al. | 526/160 |
| 5,798,424 A | 8/1998 | Kong et al. | 526/124.2 |
| 6,114,276 A | 9/2000 | Kong et al. | 502/226 |
| 6,204,216 B1 | 3/2001 | Nagy et al. | 502/103 |
| 6,211,311 B1 | 4/2001 | Wang et al. | 526/131 |
| 6,281,308 B1 * | 8/2001 | Nagy et al. | 526/172 |
| 6,897,176 B1 | 5/2005 | Nakayama et al. | 502/155 |

FOREIGN PATENT DOCUMENTS

EP 1238989 9/2002

OTHER PUBLICATIONS

Dove et al. Chem. Commun., 2152-2154(2005).*
Y. Nakayama et al., *Science and Technology in Catalysis* (2002) 517.
M. Mahanthappa et al., *Organometallics 23* (2004) 836.
M. Mahanthappa et al., *Organometallics 23* (2004) 1405.
A. Dove et al., *Chem. Commun. 16* (2005) 2152.
J. Eisch et al., *J. Organometal. Chem. 624* (2001) 229.
J. Eisch et al., *Organometallics 22* (2003) 24.
J. Eisch et al., *Eur. J. Org. Chem.* (2003) 4721.

* cited by examiner

*Primary Examiner*—Ling-Sui Choi
(74) *Attorney, Agent, or Firm*—John Tyrell; Jonathan L. Schuchardt

(57) ABSTRACT

A process for polymerizing an alpha-olefin is disclosed. The polymerization is performed in the presence of a catalyst system comprising a three-membered titanacycle. A wide variety of titanacycles can be readily prepared, making this a versatile and inexpensive olefin polymerization process.

19 Claims, No Drawings

OLEFIN POLYMERIZATION PROCESS

FIELD OF THE INVENTION

The invention relates to a process useful for polymerizing olefins. The process uses a catalyst system which incorporates a three-membered titanacycle.

BACKGROUND OF THE INVENTION

Interest in catalysis continues to grow in the polyolefin industry. Many olefin polymerization catalysts are known, including conventional Ziegler-Natta catalysts. To improve polymer properties, single-site catalysts, in particular metallocenes, are beginning to replace Ziegler-Natta catalysts. Single-site catalysts typically require large amounts of expensive activators such as methylalumoxane or salts of non-nucleophilic anions such as triphenylcarbenium tetrakis (pentafluorophenyl)borate. Many single-site catalysts are difficult to synthesize. This adds to the cost of the catalyst system. It would be desirable to incorporate some of the advantages of single-site catalysts, such as narrow molecular weight distribution and good comonomer incorporation, without the high cost.

Single-site catalysts typically feature at least one polymerization-stable, anionic ligand that is purely aromatic, as in a cyclopentadienyl system. All five carbons in the planar cyclopentadienyl ring participate in η-5 bonding to the metal. The cyclopentadienyl anion functions as a 6π-electron donor. Similar bonding apparently occurs with heteroatomic ligands such as boratabenzenyl or azaborolinyl.

U.S. Pat. Nos. 5,459,116, 5,798,424, and 6,114,276 teach olefin polymerization catalysts that do not require the use of expensive activators. U.S. Pat. No. 5,459,116 uses titanium compounds reacted with hydroxyesters such as 2-hydroxyethyl methacrylate. U.S. Pat. No. 6,114,276 reacts titanium compounds with carbodiimide ligands and U.S. Pat. No. 5,798,424 prepares five-membered chelated titanium compounds. Similarly, Eur. Pat. No. 1,238,989 and U.S. Pat. No. 6,897,176 do not require the use of expensive activators and utilize five- or six-membered chelated compounds.

Other transition metal complexes containing chelating ligands are known. U.S. Pat. No. 5,637,660 describes transition metal complexes containing chelating ligands based upon pyridine or quinoline. *Science and Technology in Catalysis* (2002) 517 describes transition metal complexes based upon phenoxyimines supported on magnesium chloride. None of these are three-membered titanacycles.

Single-site transition metal complexes based upon amine derivatives such as alkoxyamines are known for olefin polymerizations (see, for example, U.S. Pat. Nos. 6,204,216 and 6,281,308, *Organometallics* 23 (2004) 836, *Organometallics* 23 (2004) 1405, and *Chem. Commun.* 16 (2005) 2152). The nitrogen atom is bonded to a heteroatom and has two additional substitutents. Although the lone pair of electrons on the nitrogen atom coordinates with the transition metal, nitrogen is not formally bonded to the metal and a 3-membered titanacycle is not used. In the example given, the Group 4 element, zirconium, is bonded to four atoms including the oxygen atom from the monoanionic ligand (prepared from n-butyllithium and N,N-diethylhydroxylamine). The nitrogen atom is not one of the four atoms formally bonded to the zirconium.

Three-membered titanacycles have been made by reaction of Ti(II) species with pi bonds (see, for example, *J. Organomet. Chem.* 624 (2001) 229, *Organometallics* 22 (2003) 24, and *Eur. J. Org. Chem.* (2003) 4721). For example, titanium diisopropoxide can be reacted with ketones or nitriles to give the corresponding three-membered titanacycles.

While three-membered titanacycles are known, apparently olefin polymerization processes using catalyst systems incorporating a three-membered titanacycle have not been contemplated. Such a polymerization process has many advantages in ease of preparation of a wide variety of catalyst systems.

SUMMARY OF THE INVENTION

The invention is a polymerization process. An alpha-olefin is polymerized in the presence of a catalyst system comprising a three-membered titanacycle. A wide variety of titanacycles can be readily prepared from inexpensive raw materials. The process is versatile and incorporates many of the advantages of known single-site catalyst processes without the high expense associated with complex catalyst systems.

DETAILED DESCRIPTION OF THE INVENTION

The invention is a process for polymerizing an alpha-olefin in the presence of a three-membered titanacycle. One of the three atoms forming the three-membered ring is titanium. The second atom is oxygen or nitrogen. When the second atom is oxygen, the third atom is carbon, sulfur, or phosphorus. When the second atom is oxygen, the titanacycle preferably has the general formula:

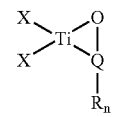

wherein Q is selected from the group consisting of C, S, and P; each R is independently selected from the group consisting of $C_1$–$C_{20}$ hydrocarbyl and silyl; when Q is C or S, n is 2; when Q is P, n is 3; and each X is independently selected from the group consisting of halide, alkoxy, siloxy, alkylamino, and $C_1$–$C_{30}$ hydrocarbyl.

The titanacycle can be conveniently made from a divalent titanium compound and the corresponding aldehyde, ketone, sulfoxide, or phosphine oxide by the following scheme where X, Q, R, and n are as previously defined.

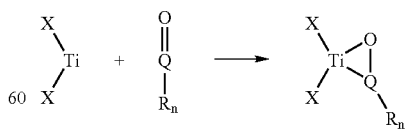

On solution storage, titanacycles can dimerize. Preferably, X provides steric bulk because this decreases the tendency to dimerize. For example, when X is isopropoxide, the stability is improved versus when X is chloride.

Exemplary structures when the second atom is oxygen:

Exemplary structures when the second atom is nitrogen:

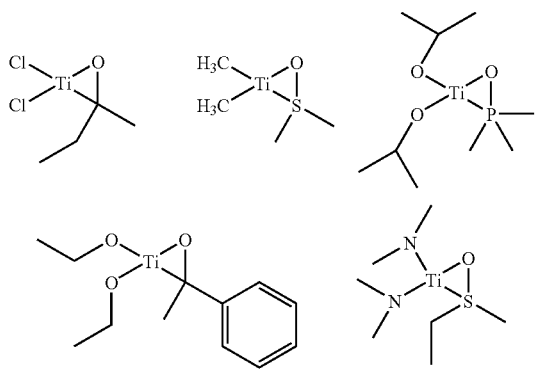
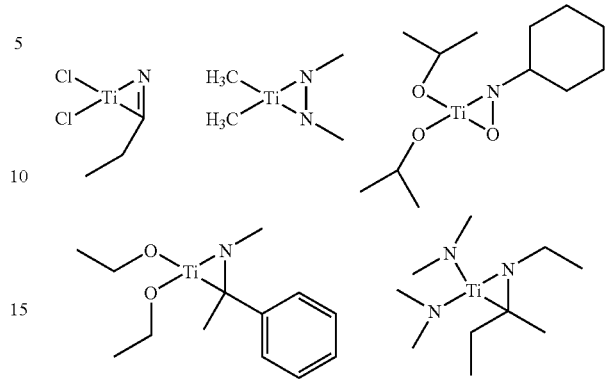

When the second atom is nitrogen, the nitrogen atom is unsubstituted or monosubstituted. When the second atom is unsubstituted nitrogen, the third atom is carbon and the titanacycle preferably has the general formula:

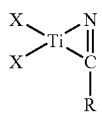

wherein X and R are as previously defined. These titanacycles can be conveniently prepared from a divalent titanium compound and the corresponding nitrile.

When the second atom is monosubstituted nitrogen, the third atom is nitrogen, oxygen, or carbon and the titanacycle preferably has the general formula:

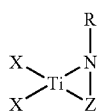

wherein Z is selected from the group consisting of oxygen, monosubstituted N, and disubstituted C; X and R are as previously defined. The titanacycle can be conveniently made from a divalent titanium compound and the corresponding imine, azo compound, or nitrone by the following scheme where X, Z, and R are as previously defined.

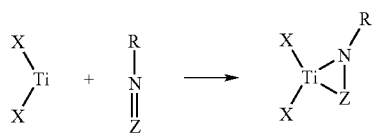

On solution storage, titanacycles can dimerize. Preferably, X provides steric bulk because this decreases the tendency to dimerize. For example, when X is isopropoxide, the stability is improved versus when X is chloride.

Preferably, the catalyst system further comprises an aluminum compound. Suitable aluminum compounds include alumoxanes such as methyl alumoxane (MAO), polymeric MAO (PMAO), and ethyl alumoxane, alkyl aluminum halides such as ethyl aluminum dichloride, dialkyl aluminum halides such as diethyl aluminum chloride, and trialkylaluminum such as trimethylaluminum, triisobutylaluminum, and triethylaluminum. When an alkyl aluminum compound is used, preferably it is an alkyl aluminum halide, a dialkyl aluminum halide or a trialkyl aluminum. More preferably it is a trialkyl aluminum.

The optimum amount of aluminum compound relative to the amount of other catalyst components depends on many factors, including the nature of the titanacycle and aluminum compound, the purity of the solvent, the desired reaction rate, the reaction conditions, and other factors. Generally, however, the amount used will be within the range of about 0.01 to about 100 moles, preferably from about 0.1 to about 50 moles, and more preferably from about 1 to about 5 moles, of aluminum per mole of titanium metal. The aluminum compound can be combined with the titanacycle and added to the reactor as a mixture, or the components can be added to the reactor separately.

Preferably, the catalyst system includes a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. More preferably, the support is silica or magnesium chloride. The amount of titanacycle added per g support material is preferably from 0.01 mmol per gram to 0.8 mmol per gram.

When silica is the support, preferably the silica has a surface area in the range of about 10 to about 1000 $m^2/g$, more preferably from about 50 to about 800 $m^2/g$, and most preferably from about 200 to about 700 $m^2/g$. Preferably, the pore volume of the silica is in the range of about 0.05 to about 4.0 mL/g, more preferably from about 0.08 to about 3.5 mL/g, and most preferably from about 0.5 to about 3.0 mL/g. Preferably, the average particle size of the silica is in the range of about 1 to about 500 μm, more preferably from about 2 to about 200 μm, and most preferably from about 5 to about 100 μm. The average pore diameter is typically in the range of about 5 to about 1000 angstroms, preferably about 10 to about 500 angstroms, and most preferably about 20 to about 350 angstroms. Preferably, the silica is dried before use. Preferably, the drying is done at a temperature of from about 100° C. to about 800° C., more preferably from about 150° C. to about 600° C.

A variety of different chemical treatments of the support can be used, including reaction with organoaluminum, -magnesium, -silicon, or -boron compounds. See, for example, the techniques described in U.S. Pat. No. 6,211,311, the teachings of which are incorporated herein by reference.

The aluminum compound can be added directly to the polymerization reactor before or after adding the titanacycle. In other words, a supported titanacycle—without the aluminum compound—can be prepared first. In one preferred process, a solution of the titanacycle is combined with the support. The mixture is stirred in an inert atmosphere at a temperature of from about 0° C. to about 120° C., more preferably from about 20° C. to about 40° C. The optimum stirring time will vary somewhat, depending upon the amounts of solvent and support, but should be long enough to ensure good mixing. Preferably, the stirring time is from about 2 minutes to about 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free flowing solid. This can be done at room temperature by applying a vacuum. In one preferred embodiment, an incipient wetness technique is used. A small amount of solvent is used to dissolve the titanacycle and the solution is added to the support. The mixture remains a free flowing solid without solvent removal. The mixture can be used as is or residual solvent may be removed.

In another preferred embodiment, a solution of the aluminum compound is added to the support prior to the addition of the titanacycle. This solution can contain all of the aluminum compound to be used, but preferably, it contains a portion of the aluminum compound to be used. Any remaining aluminum compound can be premixed with the titanacycle or can be added to the reactor at the start of the polymerization.

Even more preferably, the titanacycle is premixed with a solution of some or all of the aluminum compound prior to addition to the support. Preferably, the titanacycle and aluminum compound solution are premixed for a period of time between 1 minute and two hours. When the titanacycle is premixed with a solution of the aluminum compound, it is preferable to use a portion of the aluminum compound and to add the remainder of the aluminum compound either to the support prior to the addition of the premix or directly to the reactor.

Preferably, a scavenging amount of an alkylaluminum compound such as triethylaluminum or triisobutylaluminum is also added to the reactor. Preferably, the alkylaluminum compound is added to the reactor prior to the addition of the titanacycle.

The invention is an alpha-olefin polymerization process. By "polymerizing an alpha-olefin," we mean to include homopolymerizations as well as copolymerizations. Copolymers can be block, random, or alternating copolymers. Preferred alpha-olefins are ethylene, propylene, 1-butene, 1-hexene, 1-octene, and mixtures thereof. Ethylene and combinations of ethylene with a second olefin are more preferred.

Optionally, hydrogen is used in the polymerization processes of the invention to regulate polyolefin molecular weight. The amount of hydrogen needed depends upon the desired polyolefin molecular weight and melt flow properties. Generally, as the amount of hydrogen is increased, the polyolefin molecular weight decreases and the melt index increases. For many applications, the polyolefin melt index will be too low if the polymerization is done in the absence of hydrogen. The process provides good control of molecular weight and melt flow properties by use of small amounts of hydrogen.

The polymerizations are normally conducted under pressure. The pressure is preferably in the range of about 0.5 MPa to about 35 MPa, more preferably from about 5 MPa to about 25 MPa.

Many types of polymerization processes can be used. The process can be practiced in the gas phase, bulk, solution, or slurry. The polymerization can be performed over a wide temperature range. Generally, lower temperatures give higher molecular weight and longer catalyst lifetimes. However, because the polymerization is exothermic, lower temperatures are more difficult and costly to achieve. A balance must be struck between these two factors. Preferably, the temperature is within the range of about 0° C. to about 150° C. A more preferred range is from about 20° C. to about 90° C.

Titanacycle concentrations used for the olefin polymerizations depend on many factors. Preferably, however, the concentration ranges from about 0.01 micromoles per liter to about 100 micromoles per liter.

Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Polymerization with Titanacycle 1

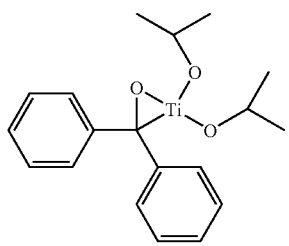

A solution of titanium tetraisopropoxide (20 mmol) in anhydrous, deoxygenated tetrahydrofuran (40 mL) is cooled to −78° C. and 25 mL of 1.6 M n-butyllithium in hexane is slowly added. The reaction mixture is stirred for one hour at −78° C., the cooling bath is removed, and the mixture is stirred at room temperature for 18 hours. Vacuum is applied to remove volatiles. The expected solid product is a mixture of titanium diisopropoxide and lithium isopropoxide. Anhydrous deoxygenated tetrahydrofuran (20 mL) is added to the solid. Benzophenone (20 mmol) is added to the stirring solution and the reaction is heated at reflux for 18 hours. Vacuum is applied to remove volatiles. The expected solid product is a mixture of titanacycle 1 and lithium isopropoxide which is used "as is" in the following polymerization.

To a 1-L stainless-steel autoclave reactor, 85 mL of 1-hexene is added. Triisobutylaluminum (1.0 mL of 1.0 M solution in heptane, 1.0 mmol) is then flushed into the reactor with nitrogen pressure and isobutane (about 400 mL), and the reactor is then pressurized with ethylene to 2.4 MPa. The reactor contents are allowed to equilibrate at 80° C. In a separate vessel, 0.5 g of anhydrous magnesium chloride is suspended in 4 mL of toluene.

Titanacycle 1 (2.0 mmol) is added, and the mixture is heated with stirring for two hours at 80° C. The mixture is cooled to room temperature, loaded into an injector arm in a glovebox, and then flushed into the reactor with isobutane (100 mL) and nitrogen pressure. The polymerization proceeds at 80° C. for 30 minutes, and the reactor is then vented. An ethylene-hexene copolymer is the expected product.

EXAMPLE 2

Polymerization with Titanacycle 2

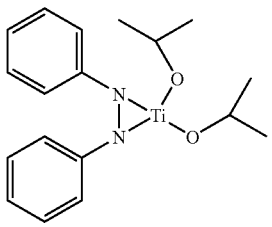

2

A solution of titanium tetraisopropoxide (20 mmol) in anhydrous, deoxygenated tetrahydrofuran (40 mL) is cooled to −78° C. and 25 mL of 1.6 M n-butyllithium in hexane is slowly added. The reaction mixture is stirred for one hour at −78° C., the cooling bath is removed, and the mixture is stirred at room temperature for 18 hours. Vacuum is applied to remove volatiles. The expected solid product is a mixture of titanium diisopropoxide and lithium isopropoxide. Anhydrous deoxygenated tetrahydrofuran (20 mL) is added to the solid. Azobenzene (20 mmol) is added to the stirring solution and the reaction is heated at reflux for 18 hours. Vacuum is applied to remove volatiles. The expected solid product is a mixture of titanacycle 2 and lithium isopropoxide which is used "as is" in the following polymerization.

To a 1-L stainless-steel autoclave reactor, 85 mL of 1-hexene is added. Triisobutylaluminum (1.0 mL of 1.0 M solution in heptane, 1.0 mmol) is then flushed into the reactor with nitrogen pressure and isobutane (about 400 mL), and the reactor is then pressurized with ethylene to 2.4 MPa. The reactor contents are allowed to equilibrate at 80° C. In a separate vessel, 0.5 g of anhydrous magnesium chloride is suspended in 4 mL of toluene. Titanacycle 2 (2.0 mmol) is added, and the mixture is heated with stirring for two hours at 80° C. The mixture is cooled to room temperature, loaded into an injector arm in a glovebox, and then flushed into the reactor with isobutane (100 mL) and nitrogen pressure. The polymerization proceeds at 80° C. for 30 minutes, and the reactor is then vented. An ethylene-hexene copolymer is the expected product.

EXAMPLE 3

Polymerization with Titanacycle 3

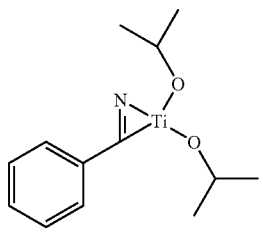

3

A solution of titanium tetraisopropoxide (20 mmol) in anhydrous, deoxygenated tetrahydrofuran (40 mL) is cooled to −78° C. and 25 mL of 1.6 M n-butyllithium in hexane is slowly added. The reaction mixture is stirred for one hour at −78° C., the cooling bath is removed, and the mixture is stirred at room temperature for 18 hours. Vacuum is applied to remove volatiles. The expected solid product is a mixture of titanium diisopropoxide and lithium isopropoxide. Anhydrous deoxygenated tetrahydrofuran (20 mL) is added to the solid. Benzonitrile (20 mmol) is added to the stirring solution and the reaction is heated at reflux for 18 hours. Vacuum is applied to remove volatiles. The expected solid product is a mixture of titanacycle 3 and lithium isopropoxide which is used "as is" in the following polymerization.

To a 1-L stainless-steel autoclave reactor, 85 mL of 1-hexene is added. Triisobutylaluminum (1.0 mL of 1.0 M solution in heptane, 1.0 mmol) is then flushed into the reactor with nitrogen pressure and isobutane (about 400 mL), and the reactor is then pressurized with ethylene to 2.4 MPa. The reactor contents are allowed to equilibrate at 80° C. In a separate vessel, 0.5 g of anhydrous magnesium chloride is suspended in 4 mL of toluene. Titanacycle 3 (2.0 mmol) is added, and the mixture is heated with stirring for two hours at 80° C. The mixture is cooled to room temperature, loaded into an injector arm in a glovebox, and then flushed into the reactor with isobutane (100 mL) and nitrogen pressure. The polymerization proceeds at 80° C. for 30 minutes, and the reactor is then vented. An ethylene-hexene copolymer is the expected product.

The preceding examples are meant only as illustrations. The following claims define the invention.

I claim:

1. A process which comprises polymerizing an alpha-olefin in the presence of a catalyst system comprising a three-membered titanacycle wherein the two remaining atoms forming the titanacycle are selected from the group consisting of: oxygen in combination with carbon, sulfur, or phosphorus; monosubstituted nitrogen in combination with oxygen or carbon; and unsubstituted nitrogen in combination with carbon.

2. The process of claim 1 wherein the alpha-olefin is selected from the group consisting of ethylene, propylene, 1-butene, 1-hexene, 1-octene, and mixtures thereof.

3. The process of claim 1 wherein the catalyst system further comprises an aluminum compound selected from the group consisting of alkylaluminum halides, dialkylaluminum halides, and trialkylaluminums.

4. The process of claim 3 wherein the aluminum compound is a trialkylaluminum selected from the group consisting of triethylaluminum, triisobutylaluminum, and trimethylaluminum.

5. The process of claim 1 wherein the titanacycle has the general formula:

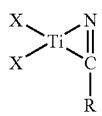

wherein R is selected from the group consisting of $C_1$–$C_{20}$ hydrocarbyl and silyl; and each X is independently selected from the group consisting of halide, alkoxy, siloxy, alkylamino, and $C_1$–$C_{30}$ hydrocarbyl.

6. The process of claim 1 wherein the titanacycle has the general formula:

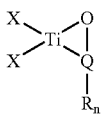

wherein Q is selected from the group consisting of C, S, and P; each R is independently selected from the group consisting of $C_1$–$C_{20}$ hydrocarbyl and silyl; when Q is C or S, n is 2; when Q is P, n is 3; and each X is independently selected from the group consisting of halide, alkoxy, siloxy, alkylamino, and $C_1$–$C_{30}$ hydrocarbyl.

7. The process of claim 1 wherein the catalyst system further comprises a support.

8. The process of claim 7 wherein the support is selected from the group consisting of silica, alumina, magnesium chloride, and mixtures thereof.

9. The process of claim 7 wherein the support is magnesium chloride deposited on silica.

10. The process of claim 1 wherein the polymerization is performed at a temperature within the range of about 30° C. to about 100° C.

11. A slurry polymerization process of claim 1.

12. A gas-phase polymerization process of claim 1.

13. A process which comprises polymerizing an alpha-olefin in the presence of a catalyst system comprising a three-membered titanacycle having the general formula:

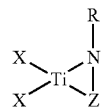

wherein Z is selected from the group consisting of oxygen, monosubstituted N, and disubstituted C; R is selected from the group consisting of $C_1$–$C_{20}$ hydrocarbyl and silyl; and each X is independently selected from the group consisting of halide, alkoxy, siloxy, alkylamino, and $C_1$–$C_{30}$ hydrocarbyl.

14. The process of claim 13 wherein the alpha-olefin is selected from the group consisting of ethylene, propylene, 1-butene, 1-hexene, 1-octene, and mixtures thereof.

15. The process of claim 13 wherein the catalyst system further comprises an aluminum compound selected from the group consisting of alkylaluminum halides, dialkylaluminum halides, and trialkylaluminums.

16. The process of claim 15 wherein the aluminum compound is a trialkylaluminum selected from the group consisting of triethylaluminum, triisobutylaluminum, and trimethylaluminum.

17. The process of claim 13 wherein the catalyst system further comprises a support.

18. The process of claim 17 wherein the support is selected from the group consisting of silica, alumina, magnesium chloride, and mixtures thereof.

19. The process of claim 13 wherein the polymerization is performed at a temperature within the range of about 30° C. to about 100° C.

* * * * *